United States Patent [19]

Williams

[11] 4,363,681

[45] Dec. 14, 1982

[54] METHOD FOR MAKING PIPE INSULATOR

[76] Inventor: Robert O. Williams, 2264 Weber Rd., Gladwin, Mich. 48624

[21] Appl. No.: 314,390

[22] Filed: Oct. 23, 1981

Related U.S. Application Data

[62] Division of Ser. No. 148,223, May 9, 1980, Pat. No. 4,327,778.

[51] Int. Cl.³ ............................................ B32B 31/18
[52] U.S. Cl. .................................... 156/64; 138/149; 138/161; 138/178; 156/256; 156/258; 156/264; 285/47; 285/179
[58] Field of Search ................. 156/64, 256, 258, 264; 138/149, 155, 158, 161, 178; 285/45, 47, 55, 179

[56] References Cited

U.S. PATENT DOCUMENTS

| | | | |
|---|---|---|---|
| 2,451,146 | 10/1948 | Baker et al. | 285/47 |
| 2,761,949 | 9/1956 | Colton | 285/179 |
| 2,937,662 | 5/1960 | Green | 138/149 |
| 3,631,898 | 1/1972 | Harley | 156/264 |
| 3,684,609 | 8/1972 | Schneider | 156/258 |
| 3,870,346 | 3/1975 | Keppeler et al. | 138/149 |

Primary Examiner—Caleb Weston
Attorney, Agent, or Firm—Price, Heneveld, Huizenga & Cooper

[57] ABSTRACT

A thermal insulator for pipe elbows and the like, comprises two pairs of split, sleeve-shaped insulative legs having interior channels in which those pipe sections joined by the elbow are received. The insulator legs include dihedral faces which are oriented toward each other at a medial portion of the elbow, and are formed by inner and outer surfaces which intersect at the central axis of the associated leg. These leg surfaces are inclined at an angle equal to a predetermined fraction of the included angle between the joined pipe sections. The inner faces of the insulator legs abut, and a wedge-shaped collar or gore is disposed between the outer leg surfaces, and includes inclined faces which mate therewith, thereby forming a closed, insulative sleeve about the pipe elbow.

3 Claims, 6 Drawing Figures

METHOD FOR MAKING PIPE INSULATOR

This is a division of application Ser. No. 148,223, filed May 9, 1980, U.S. Pat. No. 4,327,778.

BACKGROUND OF THE INVENTION

The present invention relates to thermal insulators for pipes, and in particular to a prefabricated insulator assembly for pipe elbow fittings, and the like.

The use of thermal insulating jackets around both indoor and outdoor pipes, as for chemical processes, has become an increasingly popular technique used to reduce energy losses. One such insulator having an improved protective jacket is disclosed in my copending U.S. patent application Ser. No. 148,529, filed May 9, 1980, entitled PIPE ELBOW INSULATOR AND PROTECTIVE JACKET THEREFOR, which is hereby incorporated by reference.

Heretofore, fitting an insulative jacket about a pipe elbow, or other similar fitting, was a particularly difficult and time consuming task which required the services of a highly skilled pipe fitter. For example, a 90° screwed ell was covered in the manner illustrated in the A.S.T.M. publication, Prefabrication and Field Fabrication of Thermal Insulation Fitting Covers, pg. 140, 1969, Phil., Pa., cited in the Disclosure Statement, which comprises a ten-piece assembly, wherein the insulator pieces are manually cut, fitted, and interconnected. Each piece of the insulator includes at least one compound angle cut, such that charts with various insulator dimensions must be provided to assist the pipe fitter in shaping the parts of the insulator.

SUMMARY OF THE INVENTION

In one embodiment of the present invention, an insulator is provided for pipe elbows, comprising first and second insulator legs, each having an interior channel shaped to respectively receive therein the pipe sections which are interconnected by the elbow. The insulator legs each have a dihedral face oriented toward each other at a medial portion of the elbow, wherein each dihedral face includes inner and outer surfaces which intersect at the central axis of the associated leg. Each inner surface is inclined at an angle substantially equal to one-half of the included angle between the pipe sections, and the outer surface is inclined away from the plane of the associated inner surface at an angle substantially equal to one-quarter of the included angle. A wedge-shaped insulator collar or gore is disposed between the outer surfaces of the insulator legs, and includes inclined faces which mate with the same and form a closed, insulative sleeve about the elbow.

In another embodiment of the present invention, a method is provided for fabricating pipe elbow insulators, comprising the steps of providing semi-circularly shaped insulative material having a longitudinally oriented interior channel shaped to respectively receive therein the pipe sections interconnected by the elbow. Two sets of insulative material lengths are cut in accordance with the length of the elbow for assembly into first and second split sleeve legs, and the angle included between the pipe sections is measured. A dihedral face is cut in each split sleeve leg, by forming inner and outer surfaces which intersect at the central axis of the associated leg. Each inner surface is inclined at an angle substantially equal to one-half of the included angle, and the outer surfaces are inclined away from the plane of the associated inner surface at an angle substantially equal to one-quarter of the included angle. First and second wedge shaped insulator gores are cut from another length of insulative material in a manner such that the converging sides of each gore are at an angle substantially equal to one-half of the included angle between the pipe sections, thereby forming inclined surfaces which abuttingly mate with the outer surfaces to form a closed insulative sleeve about the elbow.

The principal objects of the present invention are: to provide a thermal insulator for pipe elbows having an uncomplicated, standardized design for accommodating variously shaped fittings; to provide an insulator which is prefabricated for quick field assembly and installation; to provide an insulator which is vertically split into halves to facilitate assembly of the same over previously installed pipe fittings; to provide an insulator which is throatless, and includes a neat, six-piece assembly; to provide an insulator which is constructed by a method which includes cutting mating dihedral faces and wedge-shaped gores in accordance with the angle included between the pipe sections; to provide a method wherein the inner surfaces of two insulator legs are cut simultaneously from a single piece of material; and to provide an insulator which is economical to manufacture, efficient in use, capable of a long operating life, and particularly well adapted for the proposed use.

These and many other important advantages of the invention will be further understood and appreciated by those skilled in the art by reference to the following written specification, claims, and appended drawings.

DETAILED DESCRIPTION OF THE PREFERRED EMBODIMENTS

Figure 2:
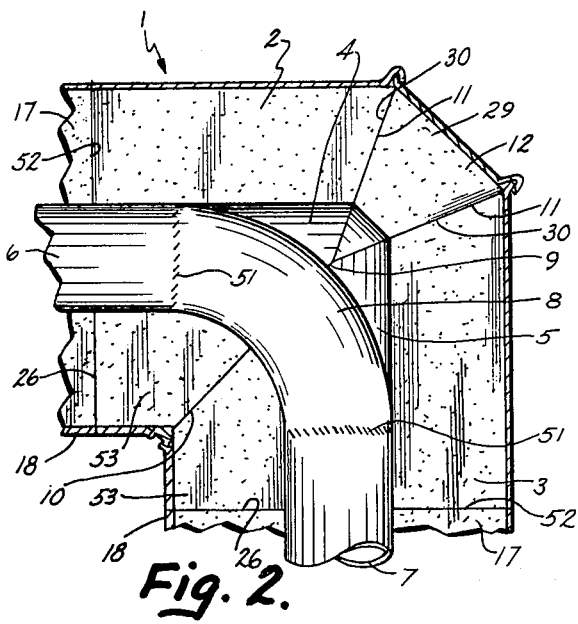
FIG. 2 is an elevational view of the pipe insulator, shown in a disassembled condition encased by a protective jacket, and with a section of pipe disposed therein.
Figure 1:
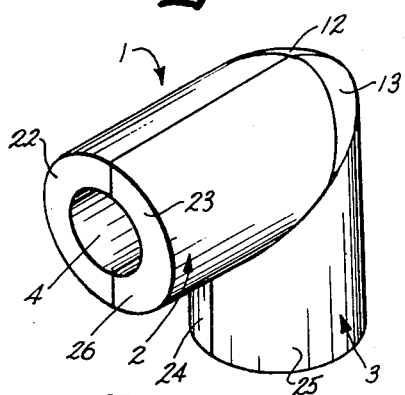
FIG. 1 is a perspective view of a pipe insulator embodying the present invention.

For purposes of description herein, the terms "upper", "lower", "right", "left", "rear", "front", "vertical", "horizontal", and derivatives thereof shall relate to the invention as oriented in FIGS. 1 and 2. However, it is to be understood that the invention may assume various alternative orientations, except where expressly specified to the contrary.

The reference numeral 1 (FIGS. 1 and 2) generally designates a thermal insulator for pipe elbows, comprising two, sleeve-shaped legs 2 and 3 having an interior channel 4 and 5 in which pipe sections 6 and 7, as well as the end portions of an elbow 8 are received. The insulator legs 2 and 3 include dihedral faces 9 which are oriented toward each other at a medial portion of the insulator, and include inner and outer surfaces 10 and 11, which are inclined in accordance with the included angle between pipe sections 6 and 7. The inner surfaces 10 of legs 2 and 3 abuttingly mate, and a pair of wedge shaped collars or gore halves 12 and 13 are disposed between outer leg surfaces 11 to form a closed, insulative sleeve about pipe elbow 8.

The insulator illustrated in FIGS. 1-5 is adapted to encase a 90°, threaded ell pipe fitting. However, it is to be understood that the insulator 1, as well as the method for fabricating the same as disclosed hereinafter, may be used in conjunction with a wide variety of different shapes and configurations, including different angles between pipe sections 6 and 7, and different length elbows 8. The insulator 1 is particularly adapted for use in conjunction with those pipe elbows having an included angle between the legs in the range of 90°-270°.

In the arrangement illustrated in FIG. 2, straight, cylindrically shaped insulators 17 enclose the linear portions of pipe sections 6 and 7, and are terminate at a position spaced inwardly from the outer edge of the pipe section. The straight insulators 17 are preferably split into two half portions to facilitate placing the same around already installed plumbing. Means such as bands, tape, wire, or the like may be used to interconnect the insulator halves, and thereby retain the insulator on the pipe. Insulators 17 are constructed of a stiff, high density insulative material, as described in greater detail hereinafter. A rigid housing or jacket 18, such as that constructed of formed sheet metal, is positioned about the insulators 17 to protect the same.

The illustrated legs 2 and 3 (FIGS. 1 and 2) are cylindrically shaped, and are vertically split into two halves 22-23, and 24-25 respectively. Each leg half 22-25 includes a semi-cylindrical interior channel 4 and 5, having a diameter substantially equal to the outside diameter of the associated pipe section 6 and 7. Leg halves 22-25 are constructed of a stiff, high density insulation such as formed glass fibers, expanded synthetic resins, and relatively soft foams, such as those known in the trade as Cleotemp and Foamglas H/T. The leg halves 22-25 are preferably constructed from a material identical with the material used in the adjacent straight insulators 17, and include a flat, outer end 26 adapted to abut and mate with an adjacent end surface of the straight insulator 17. The opposite end of each leg half 22-25 includes one-half of dihedral face 9. Dihedral face 9 is formed in each leg half 22-25 by inner and outer surfaces 10 and 11 which intersect at the central axis of the leg half in which the surfaces are disposed. Each inner surface 10 is inclined with respect to a plane perpendicular to the central axis of the leg at an angle substantially equal to one-half (½) of the included angle between pipe sections 6 and 7. Outer surfaces 11 are inclined away from the plane of the associated inner surface at an angle substantially equal to one-quarter (¼) of the included angle. In other words, the angle between the inner and outer surfaces 10 and 11 on any one leg, as measured on the exterior side thereof, is equal to 180° plus one-quarter (¼) of the included angle. For example, in the structure illustrated in FIG. 2, the angle included between pipe sections 6 and 7 is 90°. Hence, the inner surfaces 10 of the insulator legs are inclined inwardly at an angle of 45° (one-half of 90°) to a plane perpendicular with the central axis of the associated legs 2 and 3. The outer surfaces 11 are inclined at an angle of 22½° (one-fourth of 90°) away from the plane of the associated intersecting inner surface 10, such that the exterior angle between the inner and outer surfaces is 202½° (180° plus one-fourth of 90°).

As another example, if the included angle between pipe sections 6 and 7 were 120°, the insulator inner surfaces 10 would be positioned 60° (one-half of 120°) from a plane perpendicular with the central axis of the associated leg, and the outer surfaces 11 would be disposed at an angle of 30° (one-fourth of 120°) inwardly from the plane of the associated inner surface 10.

The insulator gore halves 12 and 13 are preferably separate pieces with end faces 29 which abut along a vertical plane coextensive with the plane splitting legs 2 and 3. However, it is to be understood that the gore may be one piece. Each of the gore halves 12 and 13 has a wedge shape, with a top plan configuration in the shape of an isosceles triangle, as viewed in FIG. 4. The angle between the side edges 30 of the gore halves (at the vertex 60) is one-half of the included angle between pipe sections 6 and 7. In the illustrated structure, the side edges 30 of gore halves 12 and 13 intersect at a 45° angle (one-half of 90°). The interior surfaces of the gore halves 12 and 13 include a flat base 31 with a semi-circular cavity at the vertex which forms a portion of channel 4 and 5. Gore halves 12 and 13 each have an arcuate measure of 90°, with the end edges at the center of the joint, where the central axes of legs 2 and 3 intersect.

Figure 5:
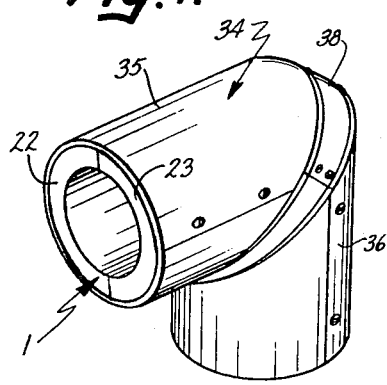
FIG. 5 is a perspective view of the insulator, shown encased by a protective jacket.

As best illustrated in FIGS. 2 and 5, the insulator 1 may be provided with a protective covering such as a mastic or preferably the illustrated rigid protective jacket or shield 34 to protect the relatively soft insulative material therebeneath. In the illustrated structure, jacket 34 is constructed of three sheet metal pieces, and includes a pair of legs 35 and 36 having inwardly inclined interior edges which are spaced apart, and a jacket gore 38 interconnecting the jacket legs 35 and 36.

Figure 6:
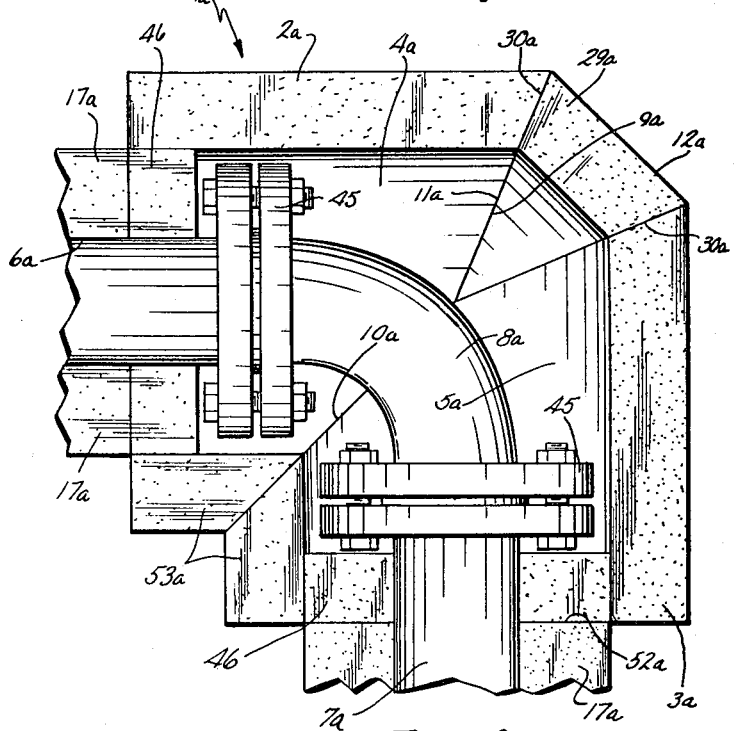
FIG. 6 is a vertical cross-sectional view of another embodiment of the insulator, particularly adapted for use in conjunction with flanged elbows.

The reference numeral 1a generally designates another embodiment of the present invention (FIG. 6) which is particularly adapted for insulating flanged pipe elbows. Since the insulator 1a is otherwise substantially the same as the previously described insulator 1, similar parts appearing in FIGS. 1-5 and 6 respectively are represented by the same, corresponding reference numeral except for the suffix "a" in the numerals of the latter. The size of the legs 2a and 3a is chosen such that the corresponding channels 4a and 5a are sufficiently large to receive the end flanges 45 of elbow 8a therein. The dihedral faces 9a on the interior surface of the insulator legs 2a and 3a, as well as the angle of the gore side faces 30a are cut in the same manner as explained in conjunction with insulator 1. Split end plugs 46 with semi-annularly shaped halves are provided to fit between the outside surface of the pipe sections 6a and 7a, and the inside surface of the corresponding insulator leg 2a and 3a to close the free ends thereof. If the outside diameter of end flanges 45 is slightly smaller than the outside diameter of the straight insulators 17a, the insulator legs 2a and 3a may be sized to fit directly onto the exterior surface of the straight insulators 17a, thereby eliminating the need for end plugs 46.

Figure 4:
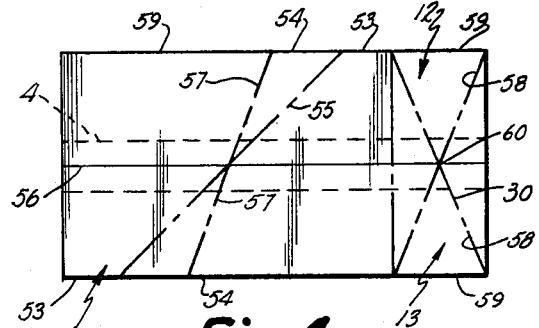
FIG. 4 is an enlarged top plan view of the section of insulative material shown in FIG. 3.
Figure 3:
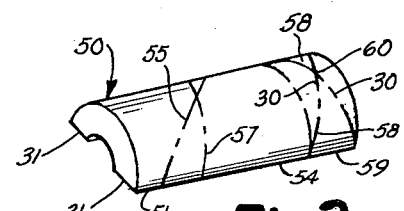
FIG. 3 is a perspective view of a section of insulative material from which the insulator is constructed, with indicia thereon to indicate the lines along which the insulative material is cut to form a portion of the insulator shown in FIG. 1.

A method for fabricating the insulator 1 comprises providing sections of semi-circularly shaped insulative material 50, such as that illustrated in FIGS. 3 and 4, wherein the channel 4 is longitudinally oriented along the interior surface thereof, and is shaped in accordance with the elbow 8 and pipe sections 6 and 7 to be encased. Four lengths of the material 50 are ultimately shaped to form the leg halves 22-25. The distance between each elbow end 51 and the corresponding end 52 of insulators 17 is measured by conventional measuring techniques. The smallest dimension or throat 53 (FIG. 4) of the leg halves is made coextensive with this measured distance between the elbow ends and the insulator ends, and is laid out along the side edge 54 of insulation section 50. In this example, the throat 53 preferably has a length in the range of ¾-6 inches. The angle included between pipe sections 6 and 7 is then measured. Since pipe elbows are typically manufactured in standard angular displacements, such as 45°, 60°, 90°, and the like, this angle may occasionally be ascertained by visual inspection. However, where custom plumbing is involved, actual measurements should be taken. The dihedral faces 9 are then cut in each of the insulator halves 22-25. Preferably, as illustrated in FIGS. 3 and 4, the inner surfaces 10 of a corresponding horizontal leg half and a vertical leg half are simultaneously cut by severing the material along the line designated by the reference numeral 55. The angle of line 55 is determined by calculating one-half of the included angle between pipe sections 6 and 7 or jacket legs 2 and 3. Line 55 originates from the inner end of throat 53 and is inclined therefrom with respect to an imaginary plane perpendicular to the central axis 56 of the insulative material 50 by the angle so calculated. After the inner surfaces 10 have been formed, the outer surfaces 11 are cut at an angle inwardly from the face formed by cutting along line 55 (the plane of inner surfaces 10) at an angle equal to one-quarter of the included angle, as illustrated by the line associated with reference numeral 57. Two sections of material 50 are cut in the above manner, thereby forming two pairs of semi-cylindrical sleeve halves which are assembled to form hollow cylindrical legs 2 and 3. The wedge shaped insulator gore halves 12 and 13 are then cut from a length of material 50 by severing the same along lines 58. The angle included between the intersecting sides 30 of the gore halves is substantially equal to one-half (½) of the included angle between pipe sections 6 and 7 or legs 2 and 3. The bases 58 of the gore halves lie along the associated side edges of insulator section 50, and each vertex 59 is disposed in the plane of central axis 56. As shown in FIG. 4, the gore halves 12 and 13 are preferably cut from opposite sides of material section 50. Cutting lines 58 are disposed at an angle equal to three-fourths (¾) of the included angle with respect to the side edges 54 of material section 50, and the cutting lines may be laid out in this manner. Both of the gore halves 12 and 13 are substantially identical in shape, and fit between the outer surfaces 11 of legs 2 and 3 to form a closed, insulative sleeve about elbow 8.

In use, insulator 1 is preferably fabricated in the above described manner, and the parts are assembled and interconnected in left and right hand halves. In the illustrated structure, left leg halves 22 and 24, and left gore half 12 are interconnected; and right leg halves 23 and 25 and right gore half 13 are interconnected. The insulator portions are connected by an adhesive, or other suitable means, and form right and left hand insulator halves which may be easily placed over the elbow 8 in an in situ environment. The insulator halves may be attached to each other by an adhesive, and the protective jacket 34 is then installed thereover. The insulative material is sufficiently soft, such that if the throat portion of the insulator halves must be trimmed slightly to mate with elbow 8 (as shown in FIG. 2), this process may be easily accomplished by simply cutting or carving away the insulative material with a pocket knife or other similar instrument at the assembly site.

The above described insulator 1 provides a prefabricated, standardized design which is adapted to accommodate variously shaped fittings and elbows. Further, the insulator 1 is constructed of a protective jacket and insulative material which is identical and therefore compatible with the insulator construction of the straight pipe sections 17. The interior dihedral faces 9 are shaped in a manner which provides a throatless insulator, which when compared to known designs, eliminates four additional insulator pieces.

In the foregoing description, it will be readily appreciated by those skilled in the art that many modifications may be made to the invention without departing from the concepts disclosed herein. Such modifications are to be considered as included in the following claims unless these claims by their language expressly state otherwise.

The embodiments of the invention in which an exclusive property or privilege is claimed are defined as follows:

1. A method of fabricating insulators for pipe elbows, and the like, comprising:
    providing semi-cylindrically shaped insulative material having a longitudinally oriented interior channel shaped to respectively receive therein pipe sections interconnected by an elbow;
    cutting first and second lengths of said insulative material in accordance with the length of the elbow for assembly into a first split sleeve leg;
    cutting third and fourth lengths of said insulative material in accordance with the length of the elbow, for assembly into a second split sleeve leg;
    measuring the angle included between the pipe sections;
    cutting a dihedral face in each split sleeve leg for orientation toward each other at a medial portion of said elbow, including forming inner and outer surfaces which intersect at the central axis of the associated leg, wherein each inner surface is inclined from a plane perpendicular with the central axis of the associated leg at an angle substantially equal to one-half (½) of the included angle, and each outer surface is inclined from the plane of the associated inner surface at an angle substantially equal to one-quarter (¼) of the included angle;
    cutting first and second wedge-shaped insulator gores from a fifth length of said material, wherein the converging sides of each gore are inclined toward each other at an angle substantially equal to one-half (½) of the included angle, and abuttingly mate with the outer leg surfaces to form a closed, insulative sleeve about the elbow.

2. A method as set forth in claim 1, wherein:
    said split sleeve legs and gores are interconnected to form prefabricated jacket halves which are easily assembled in situ over the pipe elbow for connection therewith.

3. A method as set forth in claim 1, wherein:
    said cutting steps for forming said first and second inner surfaces are performed simultaneously by cutting laterally across a piece of said insulative material at a medial portion thereof, along said inner surface angle, whereby one of the cut portions forms a half of one leg, and the other cut portion forms a half of the other leg.

* * * * *